UNITED STATES PATENT OFFICE.

ALEXANDER LISK, OF PHILADELPHIA, AND ADAM WOOLEVER, OF ALLENTOWN, PENNSYLVANIA.

IMPROVEMENT IN CONVERTING CAST-IRON INTO WROUGHT-IRON AND STEEL.

Specification forming part of Letters Patent No. 78,297, dated May 26, 1868.

*To all whom it may concern:*

Be it known that we, ALEXANDER LISK, of Philadelphia, in the county of Philadelphia and State of Pennsylvania, and ADAM WOOLEVER, of Allentown, in the county of Lehigh and State of Pennsylvania, have invented a new and useful Improvement in the Process for Converting Cast-Iron into Wrought or Malleable Iron; and we do hereby declare that the following is a full, clear, and exact description thereof, which will enable others skilled in the art to make and use the same.

Our process consists in commingling with melted cast-iron certain chemical substances, which, being decomposed by the intense heat of the iron, produce the requisite chemical change and quality in the latter, which is known as malleable or wrought iron.

The chemical substances which are thus commingled, and the usual proportions of the same, are as follows: Marble-dust, eight ounces; nitrate of soda, two ounces; borax, two ounces; litharge, ten ounces; yellow prussiate of potash, two ounces; common salt, one quart; saltpeter, four ounces; black oxide of manganese, six ounces.

The above quantities are sufficient for a charge of about five hundred pounds, more or less, of the iron.

The iron is melted until quite thin in a puddling or other suitable furnace, and the above-mentioned substances are intimately mingled together, and then stirred into the iron by the usual puddling manipulations until the iron is withdrawn from the furnace.

The ingredients which are most effective and important in our process are the marble-dust, nitrate of soda, and litharge, as some of the other ingredients may be left out or substituted by other analogous substances without materially affecting the result of the process.

We desire to be understood as not limiting our process to the precise articles and quantities above set forth, but contemplate the employment, in practice, of such modifications of the ingredients set forth in the first formula as will be found beneficial, always, however, retaining the marble-dust, nitrate of soda, and litharge, as the chiefly effective articles of the compound.

Having thus described our invention, we claim as new and desire to secure by Letters Patent—

The process of manufacture, substantially as and for the purpose set forth.

ALEXANDER LISK.
ADAM WOOLEVER.

Witnesses:
JONAS GEORGE,
EDWARD BECK.